United States Patent
Jacobsen (10) Patent No.: US 8,031,947 B2
(45) Date of Patent: Oct. 4, 2011

(54) METHOD AND SYSTEM FOR RAPID MATCHING OF VIDEO STREAMS

(76) Inventor: Kenneth P. Jacobsen, San Carlos, CA (US)

( * ) Notice: Subject to any disclaimer, the term of this patent is extended or adjusted under 35 U.S.C. 154(b) by 863 days.

(21) Appl. No.: 12/079,006

(22) Filed: Mar. 24, 2008

(65) Prior Publication Data
US 2008/0247663 A1    Oct. 9, 2008

Related U.S. Application Data

(60) Provisional application No. 60/909,907, filed on Apr. 3, 2007.

(51) Int. Cl.
*G06K 9/62* (2006.01)
(52) U.S. Cl. .................. 382/199; 382/263; 382/305
(58) Field of Classification Search .............. None
See application file for complete search history.

(56) References Cited

U.S. PATENT DOCUMENTS

| | | | | |
|---|---|---|---|---|
| 5,521,841 | A * | 5/1996 | Arman et al. | 715/723 |
| 6,363,160 | B1 * | 3/2002 | Bradski et al. | 382/103 |
| 2003/0093437 | A1 * | 5/2003 | Gargi et al. | 707/104.1 |
| 2003/0198387 | A1 * | 10/2003 | Acharya et al. | 382/199 |
| 2007/0063981 | A1 * | 3/2007 | Galyean et al. | 345/173 |
| 2008/0031523 | A1 * | 2/2008 | Kim et al. | 382/203 |
| 2008/0063312 | A1 * | 3/2008 | Bober | 382/305 |

OTHER PUBLICATIONS

Mohamed Rizon et al., Object Detection using Geometric Invariant Moment, American Journal of Applied Sciences 2(6), pp. 1876-1878, year 2006.*

* cited by examiner

*Primary Examiner* — Brian Werner (57) ABSTRACT

Techniques for managing video stream data and portions of video stream data are disclosed. In particular, the present invention enables the user to match portions of video streams against stored, previously characterized video streams using Canny edge detection filtering coupled with Hu invariant third moments of those edges. According to one aspect of the present invention, the video stream data is encoded with the following technique, which selects specific frames from the video stream, finds the edges of objects within these selected frames using Canny edge detection, separates each edge into a distinct object, calculates Hu invariant third moments for each edge, and stores each edge together with the video stream and frame identification and it's Hu invariant third moments in a database for later comparison. Similar encoding can then be performed for a query video stream to compare against the previously identified video streams stored in the database to identify a unique video stream. It is emphasized that the present invention applies to video stream data but can also be used for imagery data in any other form or taken in any spectrum.

20 Claims, 8 Drawing Sheets

METHOD AND SYSTEM FOR RAPID MATCHING OF VIDEO STREAMS

CROSS REFERENCE TO RELATED APPLICATION

This application claims priority from the U.S. Provisional Patent Application Ser. No. 60/909,907 for "Methods and systems for rapid matching of video data" filed on Apr. 3, 2007, the entire contents of which are incorporated herein by reference.

FIELD OF THE INVENTION

The invention is generally related to the area of image recognition technologies. In particular, the invention is related to a method and system for rapid matching of video streams.

BACKGROUND OF THE INVENTION

Data acquisition and storage capabilities are growing exponentially with no signs of slowing. According to a recent study, more than 100 billion photographs are taken each year. To store them all digitally would require 500 petabytes of storage. With both digital cameras and cell phones that can capture video streams, this same content explosion is occurring with video. From the medical radiology field, the entertainment industry, the government agencies for the national security, to the NASA Goddard space center's earth science project, huge amounts of imagery data and video stream data are being created and stored every day. In recent years, annual doubling in data storage capability has been the rule. In contrast, resources such as experienced minds, money, time and patience to analyze data are relatively fixed.

Currently, one of the major challenges in managing the huge amount of video stream data is related to matching a specific video stream against a library of existing video streams. Using existing methods, the search is performed with user defined inefficient queries, color histograms, color moments or other simple image characterization methods for key frames within the video stream. This traditional search puts significant burden on users to define effective queries. In addition, the traditional method does not provide an efficient means for searching today's vast quantities of video stream data.

Another significant challenge is that of overcoming video pirating or the use of proprietary or classified video imagery data without approval. Many methods have been attempted to automatically classify video content so that unauthorized use can be detected and stopped, but all these methods have been cumbersome and inaccurate.

There is, therefore, a need for solutions that perform effective and efficient matching of video streams or portions of video stream against a library of video streams stored in a video stream database.

BRIEF SUMMARY OF THE INVENTION

This section is for the purpose of summarizing some aspects of the present invention and to briefly introduce some preferred embodiments. Simplifications or omissions in this section as well as in the abstract or the title herein may be made to avoid obscuring the purpose of the section. Such simplifications or omissions are not intended to limit the scope of the present invention.

In general, the present invention pertains to management of video stream data whether from complete videos or clipped portions of videos. In particular, the present invention enables the user to match video streams or portions of video stream against a stored data in a database of previously processed and characterized video streams.

Image recognition in the animal kingdom is predominantly a recall (as opposed to logical or reasoned) activity. Only elements of images that have been previously stored can be recalled. Inputs that have no resemblance to previously stored data are not recalled, but rather, stored for future retrieval operations. By focusing on the recall of fine elements of input and the relationship of these elements to each other, we drastically reduce the dimensionality of the problem and enable recognition from incomplete, obscured, or otherwise unclearly viewed subjects.

Recognition arises from the details suggesting the whole (as opposed to dissecting the whole to understand the parts). Each detail sample suggests a range of possibilities for the potential whole. Subsequent samples narrow down the range of possible identities of the subject either by confirming or eliminating plausible classifications based solely from "prior experience"—previously stored data and end-user interactions. Recognition is successful if a small number of plausible conclusions remain after a number of samples.

According to one aspect of the present invention, the video stream imagery data is encoded with the following technique, which divides each video stream into independent frames, for selected frames creates an individual image or images whether by creating a merged gray-scale image or independent color plane images from the video frame, balances the image intensity, performs edge detection on the intensity balanced image, breaks the edges into individual pieces, compares the size of each individual edge piece against a minimum size, computes Hu invariant third moments for the edge of sufficient size, and generates and stores a set of edge indices for each edge matching the application criteria. The act of edge detection within an image can be thought of as finding those portions of an image where the image is changing most rapidly, as would be seen at the boundary of an object in the foreground of an image as compared to the background of an image.

According to another aspect of the present invention, the translation-, scale-, and rotation-invariant edge indexing mechanism allows an efficient and effective matching of edges within imagery data from the frame of the query video stream with a plurality of the stored imagery data from the previously characterized video streams in the form of edge indices. According to yet another aspect of the present invention, the matching mechanism can compare all edges contained in the frame of the original imagery data from the original video stream back to the imagery data from the query video stream to discover additional edge matches.

In one embodiment, the present invention is directed to a method for rapid video frame recall within a large set of previously characterized video stream data, where the frame is somewhere included in the previously characterized video stream data, the method includes at least the following: segmenting the video stream data into independent frames; applying a mathematical edge detection method to the individual frames which may be in the form of the Canny edge detection filter as described in the paper "A computational approach to edge detection," by J. Canny and published in IEEE Transactions for Pattern Analysis and Machine Intelligence, volume 8, pages 679 to 698 in 1986 and the paper "Using Canny's criteria to derive a recursively implemented optimal edge detector," by R. Deriche and published in International Journal of Computer Vision, pages 167 to 187 in 1987; separating the individual edges; when the size of an edge is greater than the minimum size, calculating the Hu invariant third moments for the edge; and representing the edge with a set of edge indices into a database, wherein the set of numerical edge indices is associated with the unique values of the Hu invariant third moments of that edge. The Hu invariant third moments are derived and described by the equations in Appendix A.

In another embodiment, the present invention is a method for rapid matching against previous characterized video streams, the method further includes at least the following: (m) segmenting a query video stream into independent image frames; (n) creating at least one intensity balanced image for each frame; (o) performing edge detections using an edge detection filter such as the Canny filter for each image derived from each frame; (p) calculating Hu invariant third moments for each of the edges which meet minimum size requirements for each frame; (q) calculating a set of edge indices for the edge within the query video stream using the same procedure as used for creation of the edge indices for the edge database; (r) comparing the edge data against each of the stored edges in a respective bin of the database, wherein the respective bin corresponds to the set of query indices; (s) storing matched edge data into a matched table; repeating (n)-(s) for each of the remaining of the one or more frames and edges; and determining a matched frame from the previously characterized video stream data in accordance with a set of matching rules.

In yet another embodiment, the present invention is a system for rapid video stream matching within a database of previously characterized video stream data, where the query video stream is somewhere included in the database of previously characterized video stream data, the system includes at least the following: an I/O interface; a communication interface; a secondary memory; a main memory for storing computer readable code for an application module; at least one processor coupled to the main memory, the secondary memory, the I/O interface, and the communication interface, said at least one processor executing the computer readable code in the main memory to cause the application module to perform operations of: segmenting the video stream input into at least one frame, creating at least one intensity balanced image for each of the at least one frames, calculating the edges using an edge detection filter such as the Canny filter for the at least one frame; for those edges which meet a minimum size requirement, calculating the Hu invariant third moments for each edge within the at least one frame; and representing the edge with a set of edge indices in a database, wherein the set of numerical edge indices is associated with the unique values of the Hu invariant third moments of that edge.

In yet another embodiment, the present invention is a computer program product including a computer usable medium having computer readable code embodied in the medium for causing an application module to execute on a computer for video stream matching within a database of previously characterized video stream data, where the object is a portion of the video stream data, the computer program product includes at least the following: computer readable code for segmenting the video stream into at least one frame; computer readable code for creating at least one intensity balanced image for each at least one frame, computer readable code for calculating the edges using and edge detection filter such as the Canny filter on each of the at least one frame; computer readable code, for those edges which meet a minimum size requirement, to compute the Hu invariant third moments for each edge within the at least one frame; and computer readable code for representing the edge with a set of edge indices in a database, wherein the set of edge indices is associated with the unique values of the Hu invariant third moments of that edge.

One of the objects, features, and advantages of the present invention is to effectively and efficiently match a video stream or portion of a video stream against previously characterized video streams. Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

The present invention pertains to techniques for managing video stream imagery data by calculating a plurality of integer indices ("edge indices") for the edges within each frame of the video stream data, and for rapid matching of query video stream edges within specific frames with the query data with these indices. Although specifically applied to video stream imagery data, this invention is not limited to video stream data but may also be applied to any two-dimensional and any three-dimensional imagery whether the imagery is single spectral or multi-spectral in nature. According to one aspect of the techniques, the basic token for recognition is a relatively small sample of the input data. For imagery data, this token is an edge of an object from within the image.

According to another aspect of the techniques, a process of rapid matching of a video stream is achieved by the comparison between the edge indices of the edges from a frame of the query video stream and the edge indices database created by previous characterization of other video streams. Only a relatively small number of the edges from a frame need to be compared with the edges in the edge database to match the frame from the query video stream.

The detailed description of the present invention is presented largely in terms of procedures, steps, logic blocks, processing, or other symbolic representations that directly or indirectly resemble the operations of the device or system that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it is deemed necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

"Video stream" refers to any sequence of frames in a video of any arbitrary length of one or more frames. Although the invention as describes refers to video streams, the invention may also be applied to standard two-dimensional and three-dimensional imagery data.

"Edge" represents a small portion of an image of a frame from a video stream where a significant change has occurred such that the eye is drawn to the area of change. The boundaries of an object in an image or a frame from a video stream can be referred to as edges.

"Canny edges" or "Canny edge filtering" or "Canny edge detection filtering" is a specific image processing filtering operation which finds and isolates edges within an image or a frame from a video stream. Although this specific term may be used, other edge detectors are included as appropriate edge filtering mechanisms whenever the term "Canny edges", "Canny edge filtering" or "Canny edge detection filtering" is used.

"Hu invariant third moments" is the process of calculating the third moments of each of the edges identified by the edge filtering operation. These third moments are invariant to translation, rotation and scale.

Figure 1:
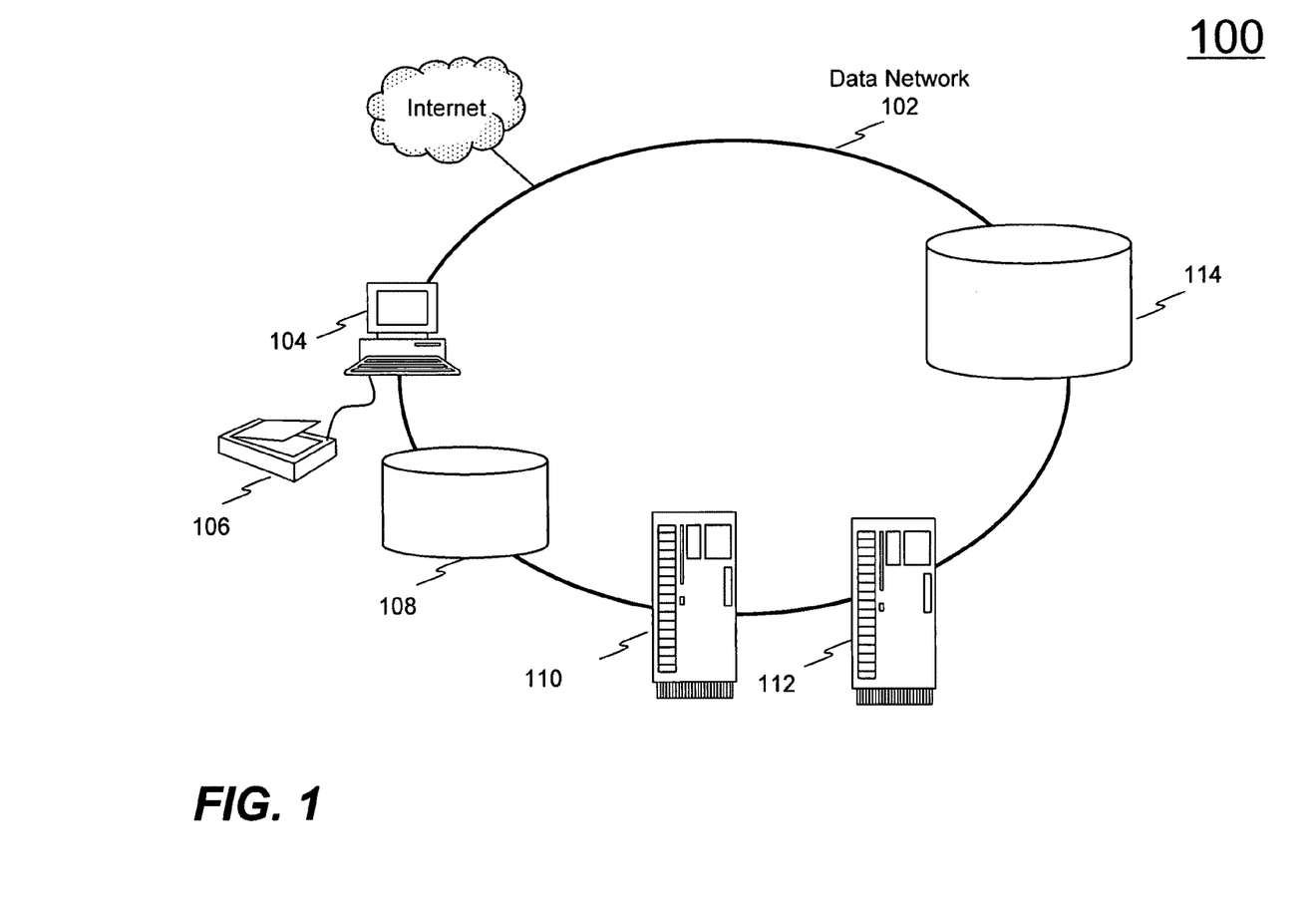
FIG. 1 is a simplified diagram showing an exemplary configuration in which one embodiment of the present invention may be practiced.

Referring now to the drawings, FIG. 1 shows an exemplary configuration 100 in which the present invention may be practiced. To facilitate the understanding of the present invention, it is assumed that the configuration 100 represents a corporation's intranet. There are a number of server computers, or servers, of which two examples 110 and 112 are shown. Each of the computers is coupled to a data network 102. The servers 110 and 112 may be located in the data center connecting to a high speed network to serve the whole corporation, or they may be located in two locations far apart from each other to serve the users located in each server's local geography. Coupling to the network 102, one example of a client computer or client 104, and two examples of storage devices 108 and 114 are also shown. Connecting to the client 104 is a scanning device 106, which facilitates the conversion of analog data (e.g., photos, books, newspapers) into digital data. The scanning devices may include, but not be limited to, devices such as scanners, cameras, movie-cameras, video recorders, video play-back units, or three-dimensional digitizers. The digital data is transmitted to the client 104 for further usage such as adding the digital data into a database. The client 104 provides an interface for users to access the devices and application modules executed on the computing devices across the network 102. The client computing device 104 may include, but is not limited to, a desk top computer, a lap top computer, or a hand-held computing device.

The storage devices 108 or 114 may be direct attached storage (DAS), network attached storage (NAS), or storage network (SAN). These storage devices provide data storage supplemental to the hard disk storage or direct attached storage device to the computing devices. In one embodiment, the storage devices 108 and 114 provide storage space for a massive database's data tables. For example, video stream data may be stored in the storage device 114, while a database containing a group of edge indices and edge data in accordance to the present invention may be stored in storage device 108. In another embodiment, the video stream database and the edge indices database may be located on the same storage device or on separated storage devices.

The network 102 may be a wired network, a wireless network or a combination of both. In one embodiment, all devices including the servers 110, 112 and client 104 are coupled to a local area network (LAN). In another embodiment, all devices could be connected across a wide area network (e.g., the Internet). Many devices (e.g., the servers 110, 112 and client 104) on the network 102 are configured to retrieve and store data (e.g., video streams or digital images). For example, the client 104, and the servers 110 and 112 can download video stream data from the Internet and store the downloaded data locally for sharing with other devices on the Internet or the network 102.

The application module, in accordance to the present invention, may be executed on at least one of the computing devices (e.g., the server 110, 112, the client 104, or the like). In one embodiment, the database software is loaded on the server 112, the video stream database is stored on the storage device 114, the application module for the present invention is loaded and executed on the server 110, an input interface to the application mode is executed on the client 104, and the edge indices database is stored on the storage device 108. New video stream data is received in the client 104. The user sets a number of control parameters and criteria via the input interface from the client computer 104. The application module executed on the server 110 will perform the tasks of creating edge indices for the new video stream data according to the control parameters and criteria. As a result of the computing tasks, the edge indices and associated data are stored into a edge indices database on the storage server 108. The video stream data are inserted into the video stream data database residing in storage server 114.

In another embodiment, the user wishes to search the video stream data database to see if there is a match for query video stream data just received. The user starts the process at client computer 104 by issuing a set of commands to control the matching criteria. The query video stream data will be processed by the application module executed in the server 110. A set of edge indices and associated date for edges from the individual frames of the query video stream data is compared with the stored edge indices and associated data to find matches. Any match between the frames of the query video stream data and the video stream data database is reported back to the user via the input interface. More details about how the present invention works are described below.

Figure 2:
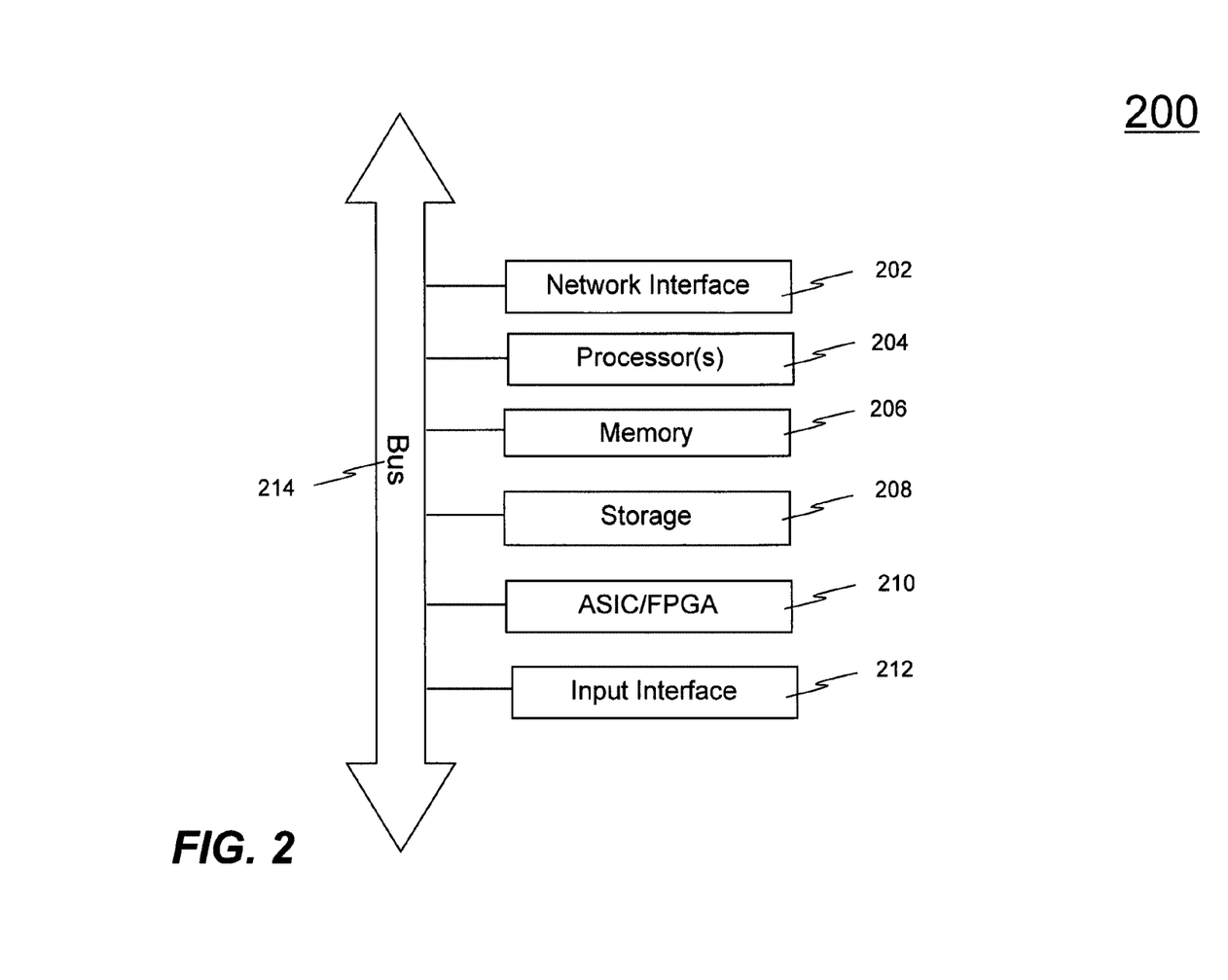
FIG. 2 is a simplified schematic diagram showing some of the components of a computing device in accordance with one embodiment of the present invention.

FIG. 2 shows an exemplary functional block diagram of a computing device 200 in accordance with the present invention. The computing device 200 includes a network interface 202, at least one processor 204, a memory 206, a hard disk storage 208, and/or a special function integrated circuit 210 (e.g., Application specific integrated circuit, ASIC or field programmable gate array, FPGA) to speed standard image processing operations. For a client computer, a user input interface 212 is usually included. To facilitate the communication within the computing device, a local bus 214 is provided. The network interface 202, the processor 204, the memory 206, the hard disk 208, the ASIC/FPGA 210 and the user input interface 212 are all coupled to the local bus 214 either directly or indirectly through other printed circuit boards. The network interface 202 facilitates a data flow between a data network (e.g., the data network 102 of FIG. 1) and the computing device 200 and typically executes a special set of rules (i.e., a protocol) to send data back and forth. One example of a protocol is TCP/IP (Transmission Control Protocol/Internet Protocol) commonly used in the Internet. In general, a network interface manages the assembling of data or files into smaller packets that are transmitted over the data network, or reassembles received packets into the original data or file. In addition, the network interface 202 handles the address part of each packet so that it gets to the right destination, or intercepts packets destined for the computing device 200.

In particular, the network interface 202 allows the computing device 200 to send or receive information such as database manipulation commands from other computing devices on the data network (e.g., the network 102 of FIG. 1). At least one processor 204 is configured to control the operation of other parts in the computing device 200. The memory 206 may be loaded with one or more software modules that can be executed by processor 204 to achieve desired tasks. According to one aspect of the present invention, a software module implementing one embodiment of the present invention is executed in the processor 204, which operates in accordance with the software module with a set of input parameters to generate a set of indices for edge data.

The hard disk storage 208 may be located within a computing device 200 or it may be located outside of the computing device. The communication between the outside hard disk storage and the computing device may include, but not be limited to, a direct link, a fiber channel, or a high speed network. In one embodiment, the hard disk storage 208 is used to store an edge indices database table that may be retrieved for lookup and matching at any time (e.g., database 108 of FIG. 1). In another embodiment, the hard disk storage 208 is used to store a video stream data database 114 of FIG. 1.

The special function integrated circuit 210 may be used to perform some of the most compute intensive functions. In one embodiment, an ASIC or FPGA may be deployed to handle the mathematical operations associated with image processing tasks. For example, a special purpose chip for computing edges by means of the edge filter could accelerate the edge filtering solution time by approximately 10-fold or more comparing to an implementation based on software alone.

Depending on the computing device, the input interface 212 may include, but not be limited to, a monitor, a keyboard, and a pointing device (e.g., mouse). In particular, the input interface enables the user to control the input to the application module and monitor the progress of the tasks performed by the application module. In one embodiment, the input interface 212 allows the user to communicate with other devices on the network 102 of FIG. 1 and to control any device directly connected to the computing device (e.g., scanning device 106 of FIG. 1).

Figure 3A:
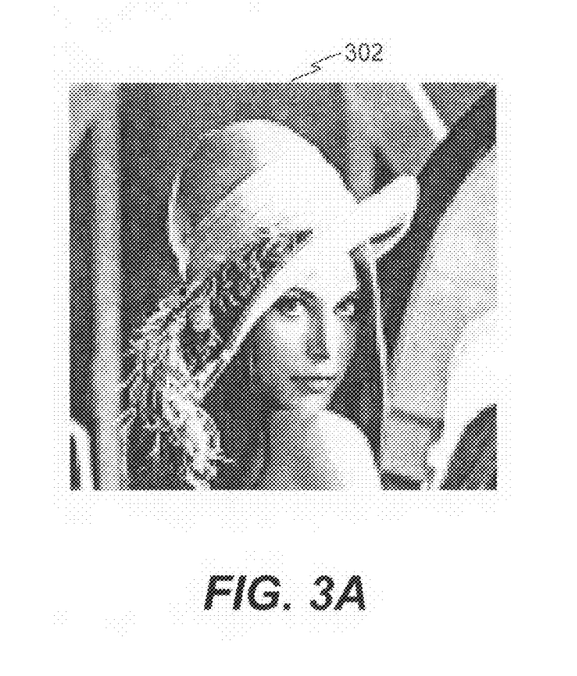
FIG. 3A is an image demonstrating the type of image which may result from examining a single frame of a video stream.
Figure 3B:
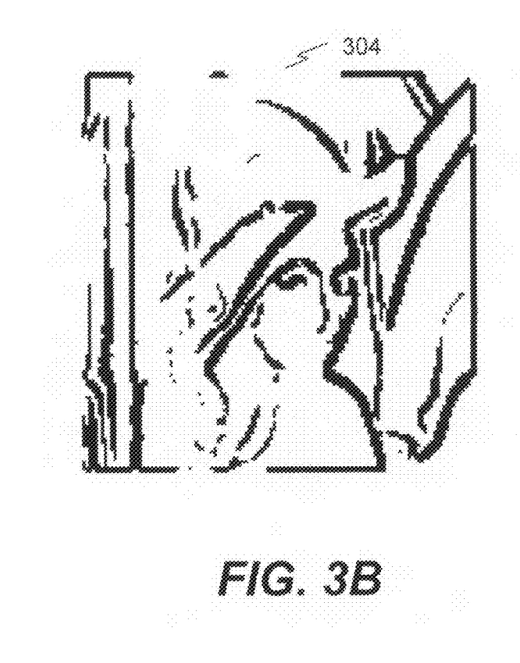
FIG. 3B is an image demonstrating the type of image which may result from examining a single frame of a video stream superimposed with one edge that may result from performance of edge detection filtering such as that done by the Canny edge detector on that image.

Referring now to FIG. 3A and FIG. 3B, there is shown an example of what may constitute an edge or image edge within an image or a frame from a video stream. The image 302 shows the image as it is ready for processing by the invention. This image may be a single independent image or a frame from a video stream. The edge 304 in FIG. 3B is an example of an edge that would be detected by means of edge filtering. Examination of FIG. 3A clearly shows where this edge is visible to the unaided eye, and the eye is drawn to this edge. Edges such as this are one of the clues humans use for identification of objects and scenes.

Figure 4:
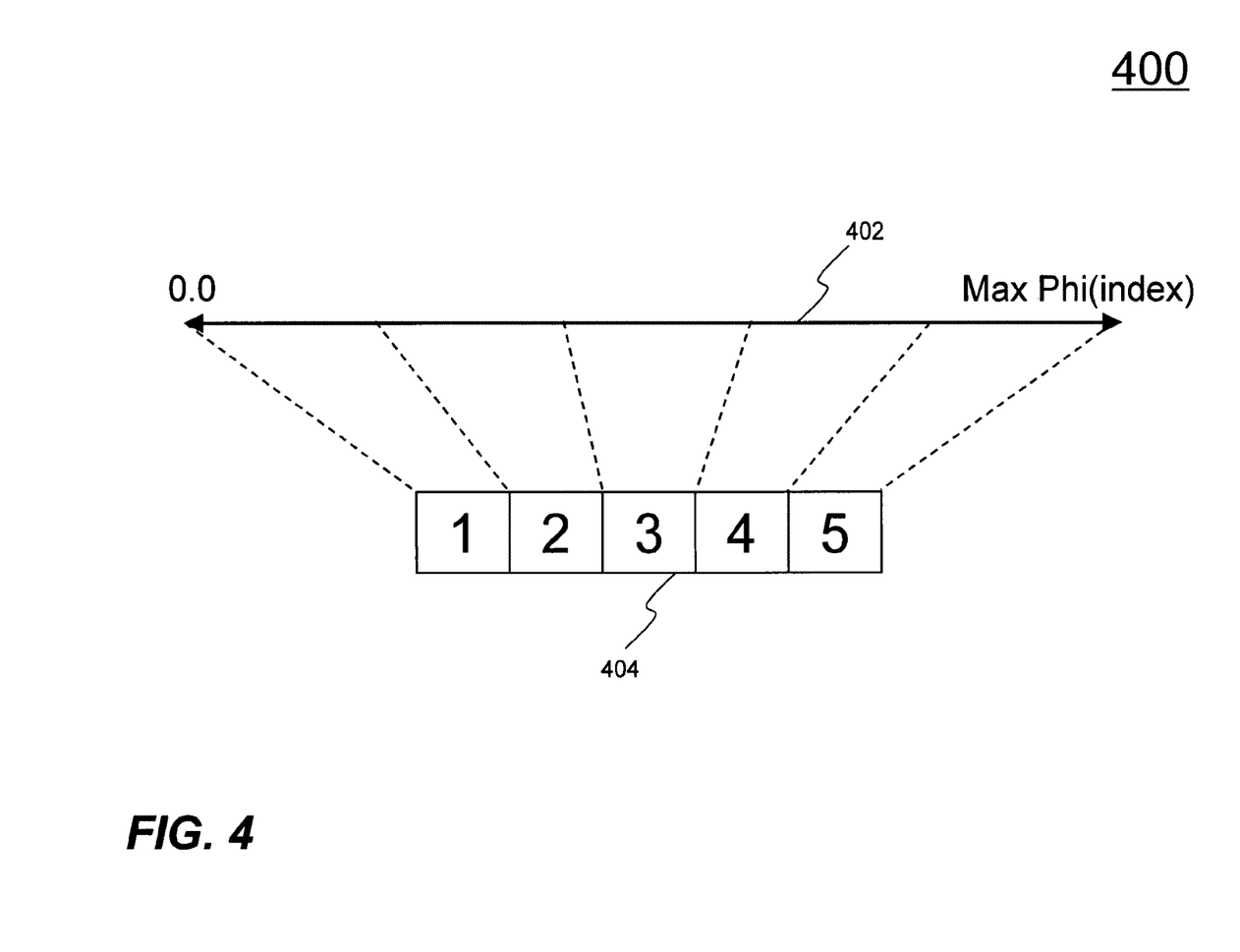
FIG. 4 is a diagram showing an exemplary indexing scheme according to one embodiment of the present invention, where each of the Hu invariant third moments may be used to calculate an index into a bin of a database for storage and later comparison.

FIG. 4 is an example of the method by which the edge indices are calculated. The upper axis, 402 represents the full range of values that can be returned for one of the seven values from the Hu invariant third moment calculation. This full range is divided into as many equal segments as are deemed necessary when the first video stream data is processed as shown by the lower axis, 404. Typically, the number of Hu invariant third moments that will be processed to create indices is two or three depending on the expected number of edges in the final edge database. The number of bins for each index would typically be in a range from 20 to 100, and is end application dependent. Two indices of size 50 which corresponds to 2,500 bins would be sufficient to properly bin data for an edge database with 1,000,000 edges, where three indices of size 50 which corresponds to 125,000 bins would be sufficient if 1,000,000,000 edges are eventually expected.

Figure 5A:
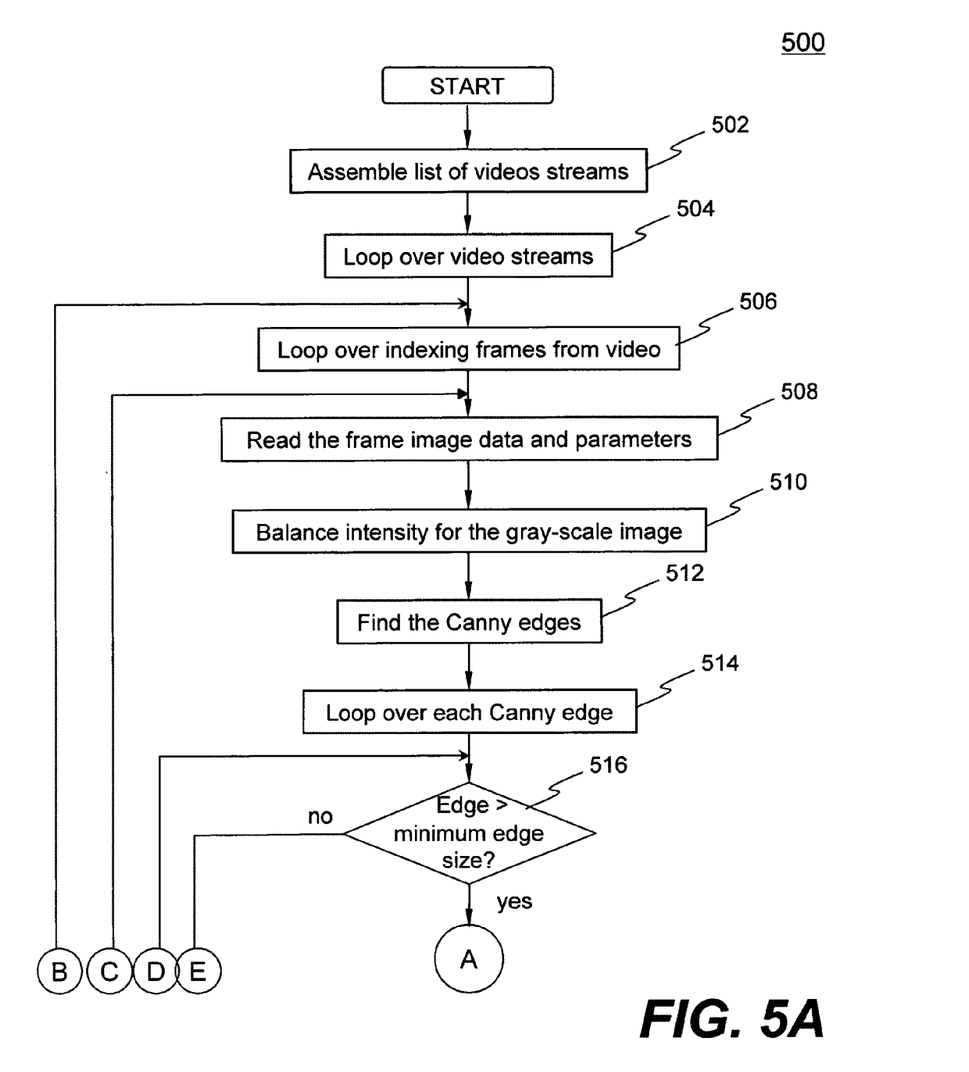
FIGS. 5A and 5B collectively show a flow chart detailing the process of the initial creation of the edge indices database from the initial video stream data according to one embodiment of the present invention.
Figure 5B:
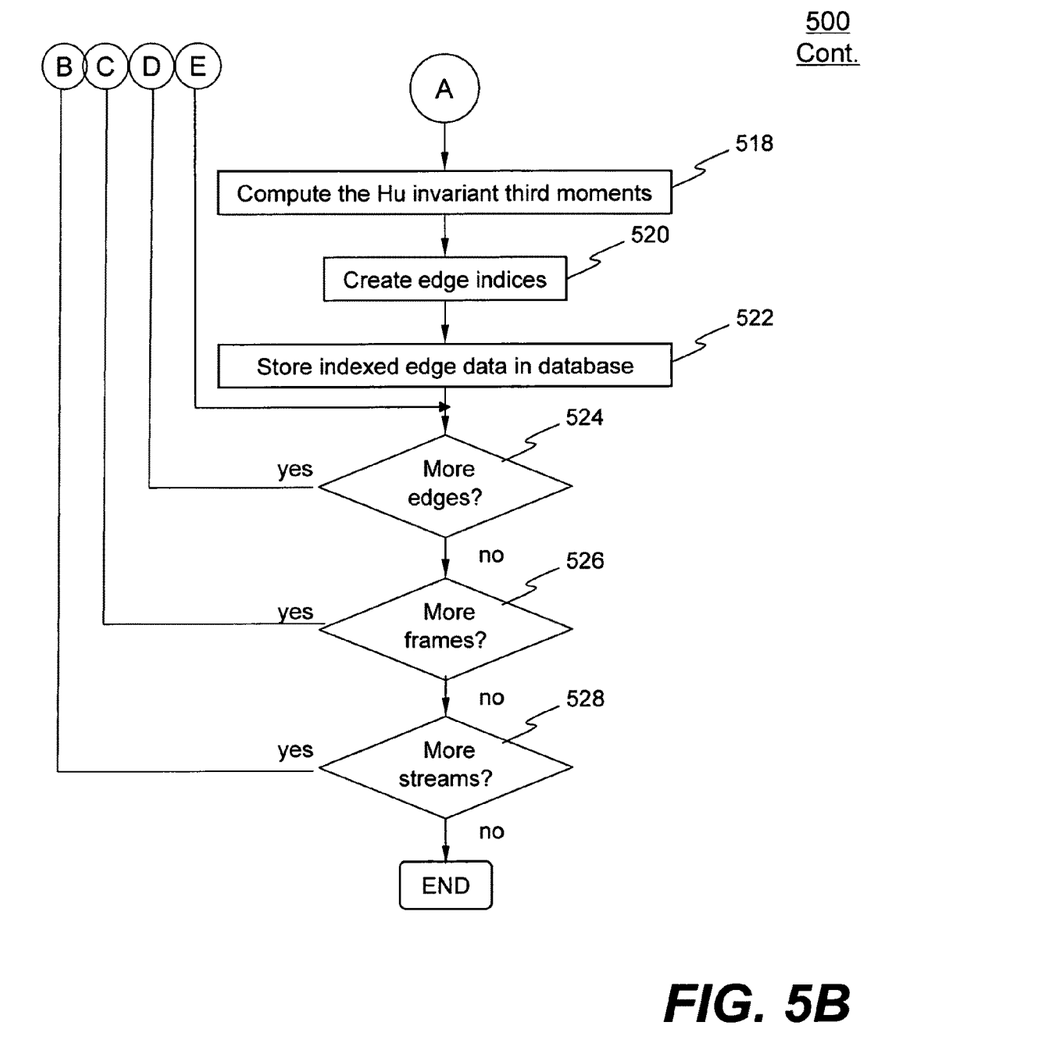

FIG. 5A and FIG. 5B contain a flowchart showing the process 500 of implementing one embodiment of the present invention for generating edge indices and a edge index database. The process 500, which is preferably understood in conjunction with the previous figures, may be implemented in software, hardware, or a combination of both. According to one embodiment, an application software module implementing the process 500 is embedded in a computing device, for example, the server 110 of FIG. 1. The software module may be loaded in the memory 206 of FIG. 2 to be executed by one or more processors 204 and operating in conjunction with video stream data and a set of user input parameters through the network 102. The input parameters may be created in a client 104. The exemplary sources of the video stream data may include a video stream coming from a video play-back device 106, the data from the video stream data database storage server 114, or video stream data received from the Internet. According to another embodiment, the software module may be loaded on more than one server (e.g., servers 110 and 112). In reality, the present invention may be executed in a massively parallel computing environment by either a multi-processor computing device or multiple computing devices or a combination of both which may also mean the index binning system would be adjusted accordingly.

The process 500 starts with the assembly of all the video streams that are to be characterized at 502, and then at 504 a loop over each of these video streams is started. Each video stream is broken down into individual frames essentially the same as individual two-dimensional imagery data at 506. Not all the frames may be of interest for characterization, so frames are skipped if input parameters indicated they aren't of interest. At 508 a frame of interest is read and decoded from its video format into a two-dimensional image and a set of parameters that describe that image. The frame of interest is converted to a gray-scale image and intensity balanced at 510 to reduce the impact of lighting effects or poor duplication quality on the characterization effort. It is also possible to process each of the color planes of the video frame independently, which might well increase the probability that a characterized edge will later be matched by information processed from a query video stream frame. Likewise, every spectral plane could be processed independently in the case of multi-spectral video imagery. The edge filtering process is performed at 512 to isolate those portions of the chosen frame from the input video stream that are abrupt changes in the image. Each of these edges is separated into individual edge data for the further processing that is to be done. When the edge filtering is by means of the Canny edge filter, the number of edges detected by Canny edge filtering in an image can be affected by means of adjusting several input parameters to the Canny algorithm. A loop over each of the edges detected by the Canny edge filter is started at 514.

At test 516, the size of each of the edges is compared against a predetermined minimum size, measured as the number of pixels in the edge. When the test 516 is false, the process 500 ends for those edges that do not meet the minimum size criteria. Else, for the edges that meet or exceed the minimum size criteria, the process 500 follows the "yes" branch to 518. At 518 third moments of the edge are calculated based on the methods originally developed by Hu. These third moments are invariant to translation, rotation and scale, which imply that the same edge at any position or rotational angle in another image of different size or scale will have the same values for the calculated third moments. This is a very useful property, because it implies that most of the standard modifications which may be made to a video stream, such as changing the size representation or cropping edges to fit on display device with a different aspect ration, will not change the values generated by the third moments of the edges. Hence these third moments of the edges are a good predictor of the existence of a specific frame from a specific video stream.

At 520, the process 500 creates a set of numerical edge indices to represent each of the edges extracted by edge filtering for the current frame from the video stream. This is performed by creating a number of bins associated with two or more of the Hu invariant third moments as described in the section of FIG. 4. After the numerical edge indices are created, the process 500 stores the edge indices and associated data into a database at 522. It is noted that each set of edge indices represents a unique edge from a specific frame of the video stream data. This relationship is also kept in the edge database, so that it is easy to trace back to the original stored video stream data. Once video stream characterization commences, the number of indices chosen becomes fixed for that particular edge indices generating process for the database and for subsequent additions to that database. In order to match these edge indices, the same indexing scheme must also apply to the edges derived from processing the query video stream data.

Process 500 is used to generate a set of edge indices to represent edges from frames of video stream data. Storing these edge indices into a database ensures an efficient and effective method for searching and matching query data against the stored data in the database.

Process 500 continues at the test at 524 on whether further edges exist to be processed from a specific frame. If yes, the next edge is processed and the generated edge indices and associated data stored as just described. If there are no more edges for this frame, a test is performed at 526 whether there are more frames to be processed. If yes, the next frame is processed as just described. If there are no more frames to process from this video stream, a check on whether more video streams exist for processing is performed at 528. If yes, the next video stream is processed as just described. If no, the process of characterizing the edges from frames of the database of edge indices completes.

Figure 6A:
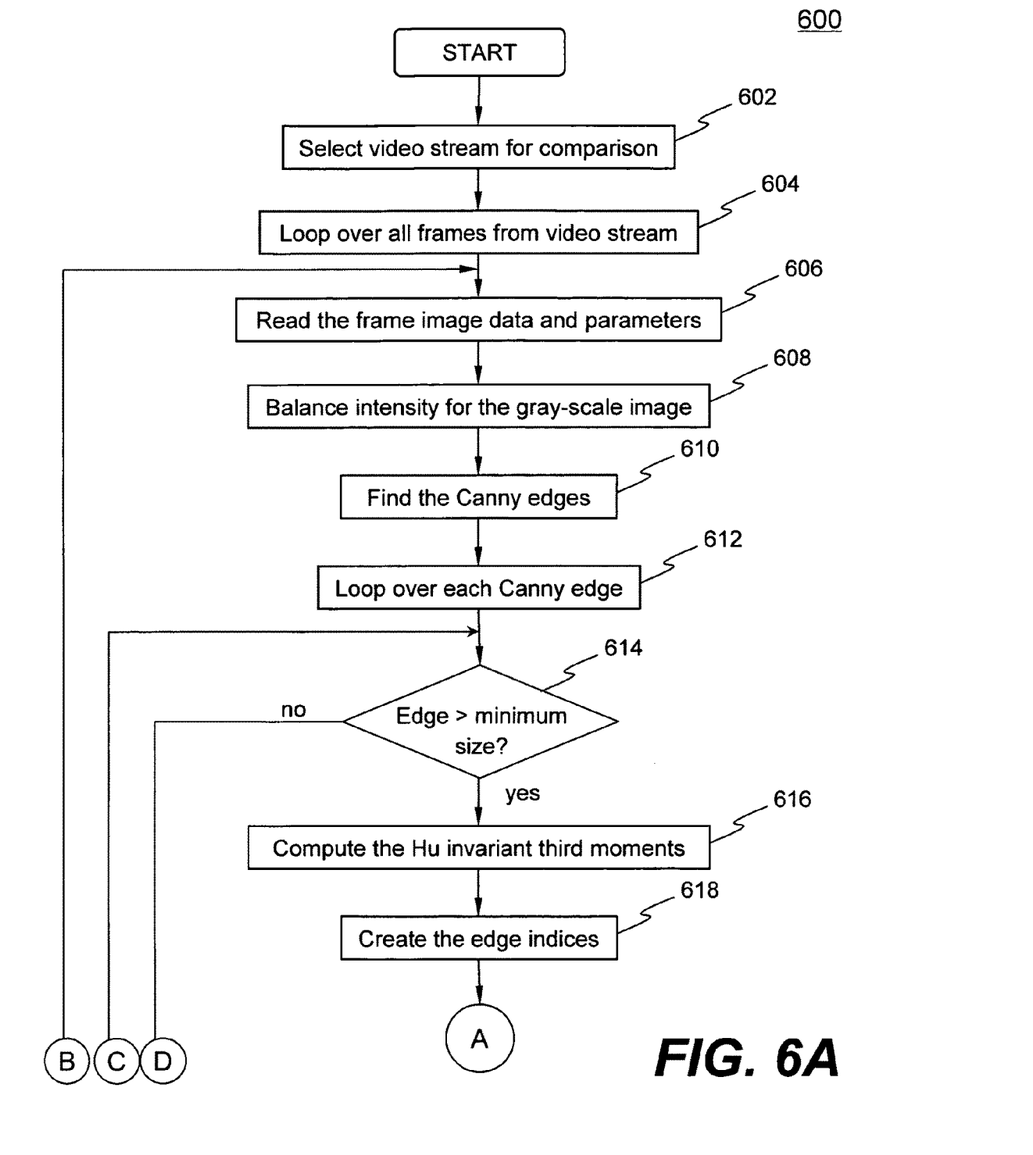
FIGS. 6A and 6B collectively show a flowchart of matching edge data against a previously created edge indices database according to one embodiment of the present invention.
Figure 6B:
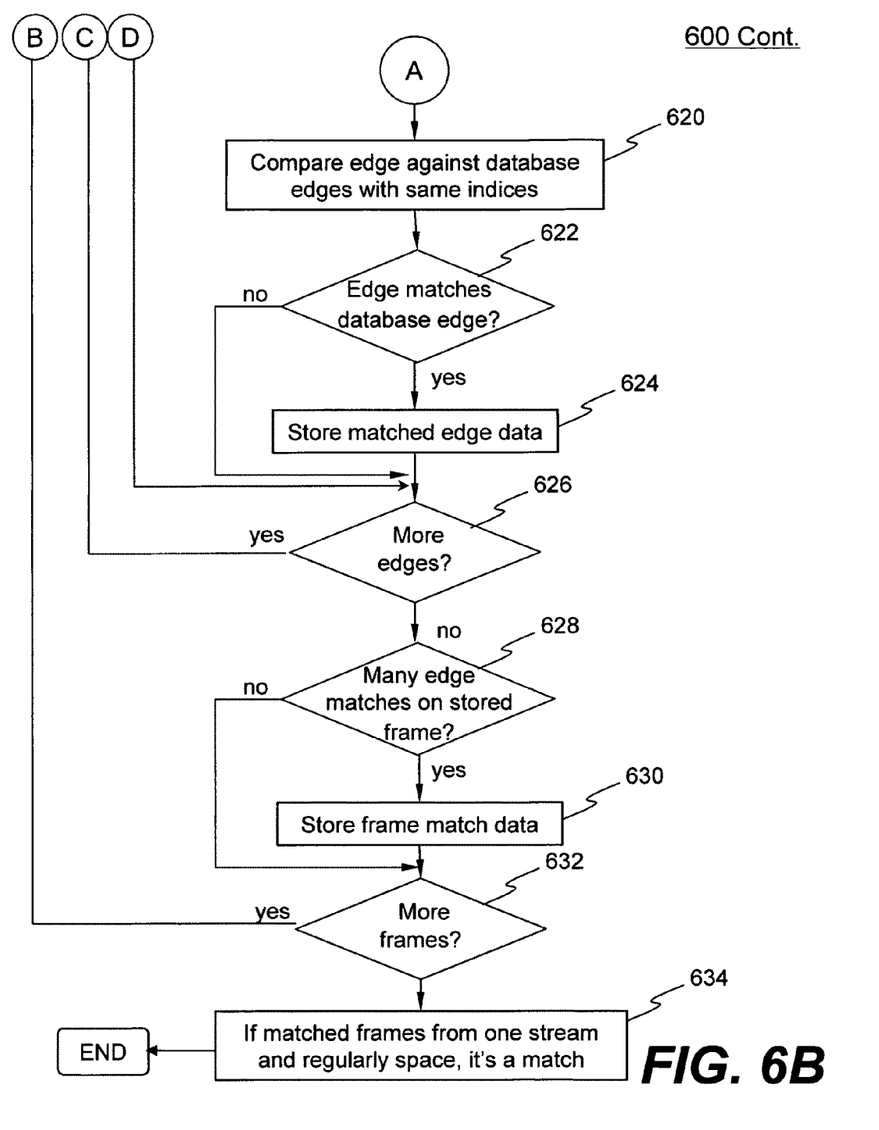

Referring now to FIGS. 6A and 6B, there is shown a flowchart or process 600 of matching edges derived from query video stream data with an edge indices database according to one embodiment of the present invention. The process 600, which is preferably understood in conjunction with the previous figures, may be implemented in software, hardware, or a combination of both.

Process 600 starts by selecting the video stream to be used as the query video stream at 602. A loop is started over every frame of the query video stream at 604, and edge indices are created by following the same steps as were taken to generate edge indices in process 500. At 606 the individual frame data is decoded and stored, at 608 the individual frame is converted to gray-scale and contrast balanced, at 610 edge filtering is performed, at 612 a loop is started over each of the generated edges, at 614 a test is performed to ensure the characterized edge meets minimum size criteria, at 616 the invariant third moments are computed, and at 618 the edge indices are calculated.

Process 600 then compares the edge indices of the frame from the query video stream with those in the edge indices database. At 622, if there is no match, the process 600 goes back to 612 for another query edge. If a match is found in the edge indices database, the match is recorded at 624 until all the edges on the frame from the query video stream are processed. If there are more edges to be processed at 626, the process will return to 612 to continue processing of the remaining edges The process 600 continues at 628 with a test on whether a significant number of edge matches have occurred for the frame from the query video stream being processed. If there have been a significant number of matches, then that frame is marked as matched, and the matching frame data are saved at 630. If the frame had few matches, then it is considered not matched, and process 600 continues to the next frame of the query video stream at 604. The percentage of edges that are positively matched against the edge index database is a parameter controlled by the end user. If there are more frames to be processed, the test at 632 sends process 600 back to 604 to continue the analysis of the next frame. If there are no more frames to be processed, the data saved for the matched frames is examined at 634 to determine if the matches are consistent with one or more contiguous video streams that were characterized to form the edge index database. If the matched frames are contiguous, the matching video stream or video streams from those characterized to form the edge index database are reported to the end user.

The present invention can be implemented in many ways, each of which may yield one or more of the following benefits, advantages or features: First, a mechanism is provided to enable a user to match arbitrary frames and edges of a query video stream data to similar frames and edges contained in a stored indexed edge data from a database. Second, the matching is scale-, rotation-, and translation-invariant. Other benefits, advantages or features can be appreciated by those skilled in the art given the detailed description herein.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the present invention can be implemented for imagery data other than video stream data such as standard two-dimensional and three-dimensional imagery data. Accordingly, the scope of the present invention is defined by the appended claims rather than the forgoing description of embodiments.

Appendix A

Development and Derivation of the Hu

Invariant Third Moments

Raw Moments

For a 2-D continuous function f(x,y) the moment (sometimes called "raw moment") of order (p+q) is defined as $$M_{pq} = \int_{-\infty}^{\infty}\int_{-\infty}^{\infty} x^p y^q f(x,y)\,dx\,dy$$

for p,q=0, 1, 2, . . . Adapting this to scalar (graytone) image with pixel intensities I(x,y), raw image moments $M_{ij}$ are calculated by $$M_{ij} = \sum_x \sum_y x^i y^j I(x,y)$$

In some cases, this may be calculated by considering the image as a probability density function, e.g., by dividing the above by $$\sum_x \sum_y I(x,y)$$

A uniqueness theorem states that if f(x,y) is piecewise continuous and has nonzero values only in a finite part of the xy plane, moments of all orders exist, and the moment sequence $(M_{pq})$ is uniquely determined by f(x,y). Conversely, $(M_{pq})$ uniquely determines f(x,y). In practice, the image is summarized with functions of a few lower order moments.

Examples

Simple image properties derived via raw moments include:

Area (for binary images) or sum of gray level (for graytone images): $M_{00}$

Centroid: $\{\bar{x}, \bar{y}\} = \{M_{10}/M_{00}, M_{01}/M_{00}\}$

Central Moments

Central moments are defined as:

$$\mu_{pq} = \int_{-\infty}^{\infty}\int_{-\infty}^{\infty} (x-\bar{x})^p (y-\bar{y})^q f(x,y)\,dx\,dy$$

where $$\bar{x} = \frac{M_{10}}{M_{00}} \text{ and } \bar{y} = \frac{M_{01}}{M_{00}}$$

are the components of the centroid.

If f(x,y) is a digital image, then the previous equation becomes $$\mu_{pq} = \sum_x \sum_y (x-\bar{x})^p (y-\bar{y})^q f(x,y)$$

The central moments of order up to 3 are:

$\mu_{00} = M_{00}$,
$\mu_{01} = 0$,
$\mu_{10} = 0$,
$\mu_{11} = M_{11} - \bar{x}M_{01} = M_{11} - \bar{y}M_{10}$,
$\mu_{20} = M_{20} - \bar{x}M_{10}$,
$\mu_{02} = M_{02} - \bar{y}M_{01}$,
$\mu_{21} = M_{21} - 2\bar{x}M_{11} - \bar{y}M_{20} + 2\bar{x}^2 M_{01}$,
$\mu_{12} = M_{12} - 2\bar{y}M_{11} - \bar{x}M_{02} + 2\bar{y}^2 M_{10}$,
$\mu_{30} = M_{30} - 3\bar{x}M_{20} + 2\bar{x}^2 M_{10}$,
$\mu_{03} = M_{03} - 3\bar{y}M_{02} + 2\bar{y}^2 M_{01}$.

It can be shown that:

$$\mu_{pq} = \sum_m^p \sum_n^q \binom{p}{m}\binom{q}{n}(-\bar{x})^{(p-m)}(-\bar{y})^{(q-n)} M_{mn}$$

Central moments are translationally invariant.

Examples

Information about image orientation can be derived by first using the second order central moments to construct a covariance matrix.

$\mu'_{20} = \mu_{20}/\mu_{00} = M_{20}/M_{00} - \bar{x}^2$
$\mu'_{02} = \mu_{02}/\mu_{00} = M_{02}/M_{00} - \bar{y}^2$
$\mu'_{11} = \mu_{11}/\mu_{00} = M_{11}/M_{00} - \bar{x}\bar{y}$ The covariance matrix of the image I(x,y) is now $$\text{cov}[I(x,y)] = \begin{bmatrix} \mu'_{20} & \mu'_{11} \\ \mu'_{11} & \mu'_{02} \end{bmatrix}.$$

The eigenvectors of this matrix correspond to the major and minor axes of the image intensity, so the orientation can thus be extracted from the angle of the eigenvector associated with the largest eigenvalue. It can be shown that this angle Θ is given by the following formula:

$$\Theta = \frac{1}{2}\tan^{-1}\left(\frac{2\mu'_{11}}{\mu'_{20} - \mu'_{02}}\right)$$

The eigenvalues of the covariance matrix can easily be shown to be $$\lambda_i = \frac{\mu'_{20} + \mu'_{02}}{2} \pm \frac{\sqrt{4\mu'^2_{11} + (\mu'_{20} - \mu'_{02})^2}}{2},$$

which are proportional to the squared length of the eigenvector axes. Thus the relative difference in magnitude of the eigenvalues is an indication of how elongated the image is.

Scale Invariant Moments

Moments where i+j≥2 can also be invariant to both translation and changes in scale by dividing central moments by the properly scaled $(00)^{th}$ moment, using the following formula.

$$\eta_{ij} = \frac{\mu_{ij}}{\mu_{00}^{(1+\frac{i+j}{2})}}$$

Rotation Invariant Moments

It is possible to calculate moments which are invariant under translation, changes in scale, and also rotation. Most frequently used are the Hu set of invariant moments, as first published by M. K. Hu as "Visual Pattern Recognition by Moment Invariants", IRE Trans. Info. Theory, vol. IT-8, pp. 179-187, 1962:

$I_1 = \eta_{20} + \eta_{02}$ $I_2 = (\eta_{20} - \eta_{02})^2 + (2\eta_{11})^2$ $I_3 = (\eta_{30} - 3\eta_{12})^2 + (3\eta_{21} - \eta_{03})^2$ $I_4 = (\eta_{30} + \eta_{12})^2 + (\eta_{21} + \eta_{03})^2$ $I_5 = (\eta_{30} - 3\eta_{12})(\eta_{30} + \eta_{12})[(\eta_{30} + \eta_{12})^2 - 3(\eta_{21} + \eta_{03})^2] + (3\eta_{21} - \eta_{03})[3(\eta_{30} + \eta_{12})^2 - (\eta_{21} + \eta_{03})^2]$ $I_6 = (\eta_{20} - \eta_{02})[(\eta_{30} + \eta_{12})^2 - (\eta_{21} + \eta_{03})^2] + 4\eta_{11}(\eta_{30} + \eta_{12})(\eta_{21} + \eta_{03})]$ $I_7 = (3\eta_{21} - \eta_{03})(\eta_{30} + \eta_{12})[(\eta_{30} + \eta_{12})^2 - 3(\eta_{21} + \eta_{03})^2] - (\eta_{30} - 3\eta_{12})(\eta_{21} + \eta_{03})[3(\eta_{30} + \eta_{12})^2 - (\eta_{21} + \eta_{03})^2]$.

The first one, $I_1$, is roughly proportional to the moment of inertia around the image's centroid, if the pixels' intensities were interpreted as physical density. The last one, $I_7$, is skew invariant, which enables it to distinguish mirror images of otherwise identical images.

What is claimed is:

1. A method of characterizing digital video data with arbitrary image edges contained therein, the characterized video data is then stored in an image edge database for rapid matching of video streams, said method comprises:
   receiving a digital video data stream;
   segmenting the received video data stream into at least one frame of pixel information;
   detecting and determining one or more image edges using an edge filter applied to the pixel information;
   calculating Hu invariant third moments for each of the detected image edges, wherein said each of the detected image edges is assigned a unique identifier based on the Hu invariant third moments;
   converting the calculated Hu invariant third moments into a set of integer indices based on a set of predefined criteria; and
   storing the unique identifier of said each of the detected image edges into an image edge database with a database location in reference to the set of integer indices.

2. The method of claim 1, further comprises creating at least one intensity balanced image from each of the at least one frame.

3. The method of claim 2, wherein each of the at least one intensity balanced image is created from a gray-scale composite of multiple color planes of the pixel information.

4. The method of claim 2, wherein each of the at least one intensity balanced image is created from individual color planes of the pixel information.

5. The method of claim 2, wherein each of the at least one intensity balanced image is created from spectral and composite image representations of the pixel information.

6. The method of claim 1, wherein the edge filter includes, but is not limited to, Canny edge filter, Sobel edge filter, gradient edge filter, Laplacian edge filter, Prewitt edge filter, Prewitt-Canny edge filter, Susan edge filter, Roberts edge filter, and Marr-Hildreth edge filter.

7. The method of claim 1, wherein the Hu invariant third moments comprise seven terms that are invariant with respect to translation, rotation and scaling of said each of the detected image edges within the frame of pixel information.

8. The method of claim 7, wherein the set of integer indices contains at least one dimension, each corresponding to one of the seven terms of the Hu invariant third moments.

9. The method of claim 8, wherein each of the set of integer indices represents a specific range in the corresponding one of the seven terms of the Hu invariant third moments.

10. A system for characterizing digital video data with arbitrary image edges contained therein, the characterized video data is then stored in an image edge database for rapid matching of video streams, said system comprises:
    a main memory for storing computer readable code for an application module; and
    at least one processor coupled to the main memory, said at least one processor executing the computer readable code in the main memory to cause the application module to perform operations of:
    receiving a video data stream;
    segmenting the received video stream into at least one frame of pixel information;
    detecting and determining one or more image edges using an edge filter applied to the pixel information;
    calculating Hu invariant third moments for each of the detected image edges, wherein said each of the detected image edges is assigned a unique identifier based on the Hu invariant third moments;
    converting the calculated Hu invariant third moments into a set of integer indices based on a set of predefined criteria; and
    storing the unique identifier of said each of the detected image edges into an image edge database with a database location in reference to the set of integer indices.

11. The system of claim 10, further comprises creating at least one intensity balanced image from each of the at least one frame.

12. The system of claim 10, wherein the Hu invariant third moments comprise seven terms that are invariant with respect to translation, rotation and scaling of said each of the detected image edges within the frame of pixel information.

13. The system of claim 12, wherein the set of integer indices contains at least one dimension, each corresponding to one of the seven terms of the Hu invariant third moments.

14. The system of claim 13, wherein each of the set of integer indices represents a specific range in the corresponding one of the seven terms of the Hu invariant third moments.

15. A non-transitory computer usable medium having computer executable instructions stored thereon for controlling a computer system for characterizing digital video data with arbitrary image edges contained therein, the characterized video data is then stored in an image edge database for rapid matching of video streams by a method comprising:
    receiving a video data stream;
    segmenting the received video stream into at least one frame of pixel information;
    detecting and determining one or more image edges using an edge filter applied to the pixel information;
    calculating Hu invariant third moments for each of the detected image edges, wherein said each of the detected image edges is assigned a unique identifier based on the Hu invariant third moments;

converting the calculated Hu invariant third moments into a set of integer indices based on a set of predefined criteria; and storing the unique identifier of said each of the detected image edges into an image edge database with a database location in reference to the set of integer indices.

16. The non-transistory computer usable medium of claim 15, wherein said method further comprises creating at least one intensity balanced image from each of the at least one frame.

17. The non-transitory computer usable medium of claim 15, wherein the Hu invariant third moments comprise seven terms that are invariant with respect to translation, rotation and scaling of said each of the detected image edges within the frame of pixel information.

18. The non-transitory computer usable medium of claim 17, wherein the set of integer indices contains at least one dimension, each corresponds to one of the seven terms of the Hu invariant third moments.

19. The non-transitory computer usable medium of claim 18, wherein each of the set of integer indices represents a specific range in the corresponding one of the seven terms of the Hu invariant third moments.

20. The non-transitory computer usable medium of claim 17, wherein the image edge database comprises a plurality of bins, each of the bins corresponds to one of the set of integer indices.

* * * * *